United States Patent
Shurin et al.

(10) Patent No.: US 9,921,637 B2
(45) Date of Patent: Mar. 20, 2018

(54) MULTI-PORT POWER PREDICTION FOR POWER MANAGEMENT OF DATA STORAGE DEVICES

(71) Applicant: Freescale Semiconductor, Inc., Austin, TX (US)

(72) Inventors: Dmitriy Shurin, Netaniya (IL); Ron-Michael Bar, Ramat Hasharon (IL); Eran Glickman, Rishon Le Zion (IL)

(73) Assignee: NXP USA, Inc., Austin, TX (US)

( * ) Notice: Subject to any disclaimer, the term of this patent is extended or adjusted under 35 U.S.C. 154(b) by 4 days.

(21) Appl. No.: 14/922,348

(22) Filed: Oct. 26, 2015

(65) Prior Publication Data

US 2017/0115723 A1    Apr. 27, 2017

(51) Int. Cl.
*G06F 1/32* (2006.01)
(52) U.S. Cl.
CPC .......... *G06F 1/3268* (2013.01); *G06F 1/3287* (2013.01)
(58) Field of Classification Search
None
See application file for complete search history.

(56) References Cited

U.S. PATENT DOCUMENTS

| | | | | |
|---|---|---|---|---|
| 6,751,213 B1 * | 6/2004 | Sun | ................... | H04L 12/40163 370/352 |
| 6,977,930 B1 * | 12/2005 | Epps | ....................... | H04L 47/10 370/392 |
| 8,230,244 B1 * | 7/2012 | Yeung | ................... | G06F 1/3221 713/320 |
| 8,443,221 B2 | 5/2013 | Kagan et al. | | |
| 2003/0154427 A1 * | 8/2003 | Hermann | ............ | G06F 11/2005 714/31 |
| 2008/0104431 A1 * | 5/2008 | Shimada | ............... | G06F 1/3221 713/300 |
| 2008/0126616 A1 * | 5/2008 | Kumasawa | ........... | G06F 1/3221 710/42 |

(Continued)

FOREIGN PATENT DOCUMENTS

WO    WO2014/051722    4/2014

OTHER PUBLICATIONS

AHCI Wiki, https://web.archive.org/web/20140710231839/http://wiki.osdev.org/AHCI, Jul. 10, 2014, Introduction.*

(Continued)

*Primary Examiner* — Jaweed A Abbaszadeh
*Assistant Examiner* — Cheri Harrington

(57) ABSTRACT

Multi-port power prediction for power management of data storage devices is disclosed. For certain embodiments, a host interface within a port multiplier receives host messages from a host device for a plurality of data storage devices. The port multiplier then uses a plurality of ports to forward device messages to the data storage devices based upon the host messages. A power prediction controller determines target data storage devices for access commands within the host messages and generates power commands to adjust power modes for target data storage devices to place the target data storage devices in active power modes prior to access according to the access commands from the host device. Power up latency is thereby reduced or eliminated for the target data storage devices.

16 Claims, 5 Drawing Sheets

(56) References Cited

U.S. PATENT DOCUMENTS

| | | | | |
|---|---|---|---|---|
| 2008/0183921 A1* | 7/2008 | Chang | ............... | G06F 3/061 |
| | | | | 710/58 |
| 2009/0094406 A1* | 4/2009 | Ashwood | ............. | G06F 13/404 |
| | | | | 711/103 |
| 2014/0089693 A1 | 3/2014 | Ooi | | |
| 2014/0298117 A1* | 10/2014 | Ahmadi-Ardakani | | G06F 11/0757 |
| | | | | 714/55 |
| 2015/0257187 A1* | 9/2015 | Kwon | ............... | H04L 12/18 |
| | | | | 370/329 |

OTHER PUBLICATIONS

Synopsys, "Using Port Multipliers With a Sata Host for Higher Performing Storage", DesignWare Technical Bulletin, 2 pgs. (Sep. 2015).

* cited by examiner

MULTI-PORT POWER PREDICTION FOR POWER MANAGEMENT OF DATA STORAGE DEVICES

TECHNICAL FIELD

This technical field relates to communications between host devices and multiple data storage devices and, more particularly, to such communications using port multipliers.

BACKGROUND

Hard disc drive (HDD) and other data storage device access systems often use port multipliers to interface between host devices and multiple data storage devices. For example, SATA (Serial Advanced Technology Attachment) port multipliers are often connected between a single host port and data storage devices and often have support for up to fifteen (15) different endpoint data storage devices. The resulting data storage network increases both storage capacity and host utilization but also requires system level power management to be provided for the attached data storage devices.

A Host-on-Demand (HOD) algorithm is one power management scheme that is often used to manage power modes for data storage devices, such as HDD devices, attached to a SATA port multiplier. The HOD algorithm provides that the power state of a given storage device may change only when the host processes a command for that storage device. Because the changing of power states can take up to several seconds using the HOD power management algorithm, access latency can be significant when power up is required for data storage devices that are in low power modes when accessed. This access latency can cause poor communication bandwidth utilization that degrades overall performance. Alternatively, low power modes can be avoided to reduce or eliminate such power up delays and thereby avoid this access latency. However, this avoidance of low power modes can significantly reduce the amount of power that can be saved in operating the data storage devices. As such, power savings are often sacrificed to achieve reduced access latency when HOD power management algorithms are applied.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Multi-port power prediction for power management of data storage devices is disclosed. For certain embodiments, a host interface within a port multiplier receives host messages from a host device for a plurality of data storage devices. The port multiplier then uses a plurality of ports to forward device messages to the data storage devices based upon the host messages. A power prediction controller determines target data storage devices for access commands within the host messages and generates power commands to adjust power modes for target data storage devices to place the target data storage devices in active power modes prior to access according to the access commands from the host device. As such, system latency is reduced because power up time is reduced or eliminated for the target data storage devices. A variety of additional or different features and variations can also be implemented.

In operation, the disclosed embodiments save time (e.g., seconds) in power up of data storage devices, such as hard disc drive (HDD) devices and solid state drive (SSD) devices, being accessed by a host device through the power prediction techniques described herein. These time savings thereby allow the use of deeper power-down and sleep modes that are avoided in current solutions due to degradation in performance from large power up latencies. For the certain disclosed embodiments, power prediction controllers within port multipliers sample and decode messages (e.g., Host to Device (H2D) Frame Information Structure (FIS) command messages) from host devices in order to predict accesses to data storage devices and to adjust their power modes prior to such accesses. As such, power states for attached data storage devices can be monitored and controlled by the port multiplier to activate the data storage devices, which may currently be in power save modes, for upcoming host accesses. Access latency is thereby reduced for host devices.

For certain additional embodiments, a NP (next port) field is added to host messages to identify one or more next ports and associated data storage devices to be accessed in a subsequent host messages. The NP field is then used by the power prediction controller to adjust the power mode of data storage devices to be accessed. For certain further embodiments, counters are added and used to keep track of idle time periods for the data storage devices, and data storage devices are automatically powered down by the port multiplier if a predetermined idle time period has passed. It is further noted that the disclosed embodiments are useful for a wide variety of data storage device technologies including SATA (Serial Advanced Technology Attachment) storage device systems that use FIS command messages from host devices to control data storage devices attached to port multipliers.

Figure 1:
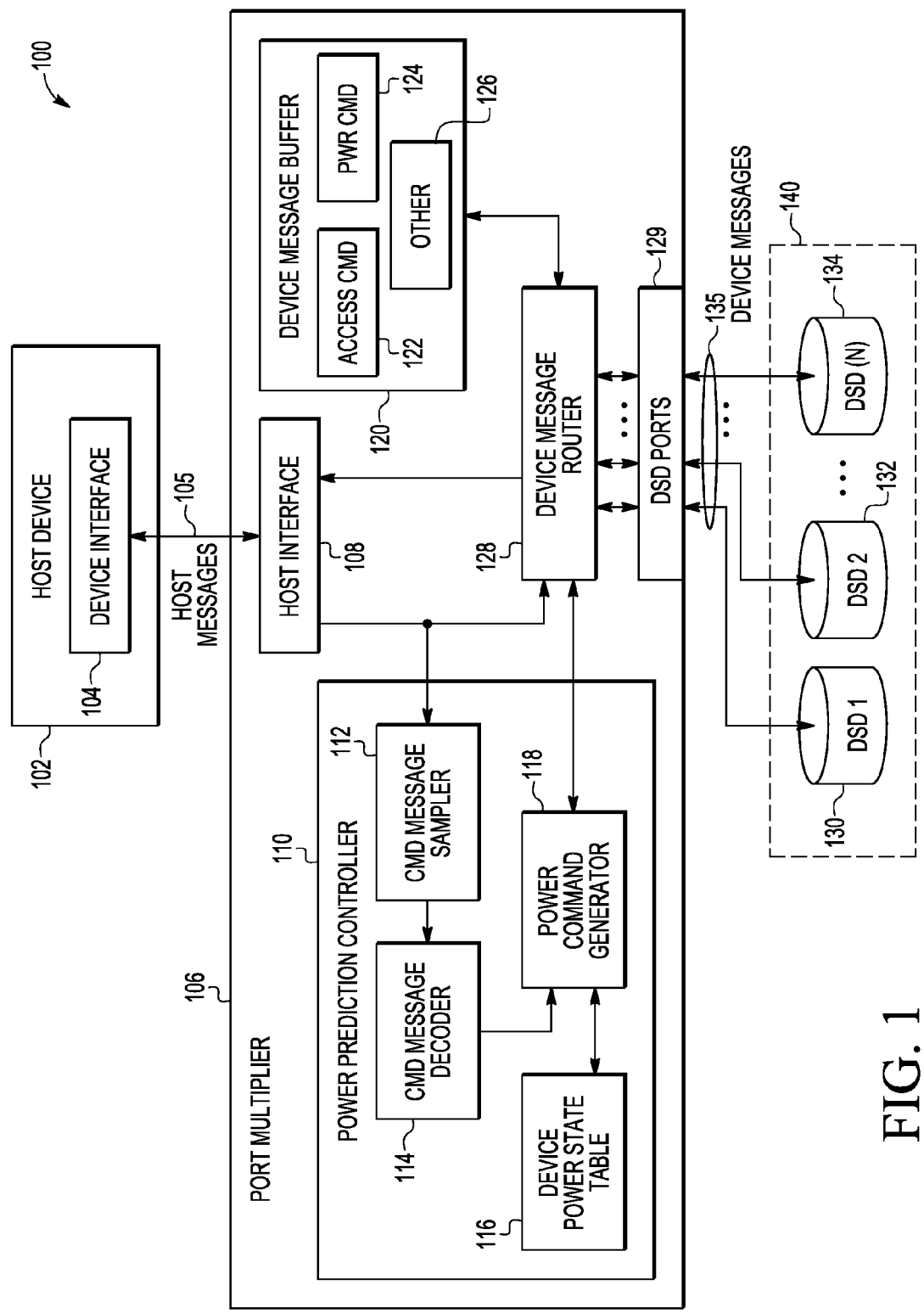
FIG. 1 is a block diagram of an example embodiment for a storage system environment including a host device, a port multiplier, and a plurality of data storage devices where power prediction is provided by the port multiplier to reduce system latency.

FIG. 1 is a block diagram of an example embodiment 100 for a storage system environment including a host device 102, a port multiplier 106, and a plurality of data storage devices 140 including data storage devices (DSD1, DSD1, . . . DSD(N)) 130, 132, . . . 134. The host device 102 includes a device interface 104 that communicates host messages 105 with a host interface 108 within the port multiplier 106. The port multiplier 106 includes a power prediction controller 110, a device message buffer 120, and a device message router 128. As described further below, the device message buffer 120 stores device messages associated with the operation of the data storage devices 130, 132, . . . 134 including access command (CMD) messages 122, power command (CMD) messages 124, and other messages 126. The power prediction controller 110 includes a command message sampler 112, a command message decoder 114, a power command generator 118, and a device power state table 116. The device message router 128 distributes the device messages 135 from the device message buffer 120 to the target data storage devices 130, 132, . . . 134 through the data storage device (DSD) ports 129. The DSD ports 129 include a communication port for each data storage device 130, 132, . . . 134. The data storage devices 130, 132, . . . 134 can be hard disc drives (HDDs), solid state drives (SSDs), or other data storage devices as well as combinations of different types of data storage devices.

In operation, host messages 105 are received from the host device 102 through the host interface 108 and are sent to the device message router 128 and the command message sampler 112 within the power prediction controller 110. The command message sampler 112 processes the host messages 105 to identify access commands within the host messages 105. Access commands are then sent to the command message decoder 114, and the command message decoder 114 determines target ports for the data storage devices that will be accessed by the access commands. This information concerning target ports is then provided to power command generator 118. The power command generator 118 uses the device power state table 116 to determine the current power states for the target data storage devices associated with the target ports and generates one or more power commands to adjust their power modes, if needed, to place the data storage devices in active power modes in preparation for their upcoming accesses. These power commands are then sent to the device message router 128 where they are stored within the device message buffer 120 as power commands 124 to be later routed to the target data storage devices. The device message router 128 also stores the access commands 122 and other messages 126 received from the host device through the host interface 108 within the device message buffer 120 and then routes each message after some delay period to a target data storage device among the data storage devices 130, 132, . . . 134. As such, access commands 122 and other messages 126 from the host device 102 along with power commands 124 from the power prediction controller 110 are stored within the device message buffer 120 for routing to target data storage devices among the data storage devices 130, 132, . . . 134. It is noted that return data and messages from the data storage devices 130, 132, . . . 134 can also be received by the device message router 128 and can be forwarded back through the host interface 108 to the host device 102.

In contrast with prior solutions that blindly route host messages to target ports, the power prediction controller 110 samples and decodes the incoming host messages 105 from the host device 102, such as FIS messages, to predict data storage devices 130, 132, . . . 134 for upcoming accesses and to adjust their power modes prior to those accesses. In particular, the power command generator 118 generates one or more power commands 124 to adjust power modes for the target data storage devices to be accessed by access commands 122 within the host messages 105. The power command generator 118 can also generate and send other commands to the data storage devices 130, 132, . . . 134, such as status commands, that are used by the power prediction controller 110. It is noted that the power prediction controller 110 can also be configured to initiate a set of extended power commands (EPC) and non-volatile cache power management (NVCPM) commands in order to support additional power modes where available within the data storage devices 130, 132, . . . 134. The following table provides example commands that can be generated and issued by the power prediction controller 110.

TABLE 1

EXAMPLE COMMANDS FOR POWER PREDICTION CONTROLLER 110

| Command | Code (HEX) | Description |
| --- | --- | --- |
| IDENTIFY DEVICE | EC | Command to device that returns an identification code |
| IDENTIFY PACKET DEVICE | A1 | Command to device that returns a packet identification code |
| CHECK POWER MODE | E5 | Command that returns power mode for data storage device |
| NOP | 00 | No operation command |
| READ DMA | C8 | Read media command such as Direct Memory Access (DMA) command |
| ENABLE PUIS FEATURE SET | 06 | Enables power up in standby (PUIS) feature set for data storage device if available |
| PUIS DEVICE SPIN-UP | 07 | Device spin-up command where PUIS feature set is enabled |
| COMRESET | NA | Reset communications with the data storage device and clears any pending messages |

As stated above, the device power state table 116 can be used by the power prediction controller 110 to store the current power state for each of the data storage devices 130, 132, . . . 134. For example, the power prediction controller 110 can communicate with each of the data storage devices 140 to determine current power states (e.g., if uncertain of a current power state for a given device), and these power states are stored within the device power state table 116 and/or used to update power state information already stored within the device power state table 116. The power command generator 118, for example, can be configured to generate commands to the data storage devices 140 that cause the data storage devices 140 to report their current power states to the power prediction controller 110. These power states for the data storage devices 140 can be a variety of different power states or modes including active power modes, power down modes, sleep modes, and/or other power modes. The following table provides example power modes for the data storage devices 130, 132, . . . 134 and provides example codes for these power modes that can be stored as 3-bit values within the device power state table 116. As described herein, the data storage devices 130, 132, . . . 134 are placed in the active power mode (PM0) before access commands are performed by the data storage devices 130, 132, . . . 134. However, the data storage devices 130, 132, . . . 134 can be in one of the other power-down or sleep modes when an access command is issued within a host message 105 received by the port multiplier 106 from the host device 102.

TABLE 2

EXAMPLE POWER STATE TABLE VALUES STORED PER PORT FOR THE DATA STORAGE DEVICES

| 3-Bit Value | Mode | Power Mode Description |
|---|---|---|
| 000 | PM0 | Active |
| 001 | PM1 | Idle |
| 010 | PM2 | Standby (spin up is required) |
| 011 | PM3 | Sleep mode (port reset and HDD/SSD spin up are required) |
| 100 | PM4 | PUIS (Power Up In Standby) |
| 101 | PM5 | PUIS and spin-up subcommand not supported |
| 110 | PM6 | PUIS and spin-up subcommand supported |
| 111 | Reserved | Reserved for additional modes |

For initialization in some embodiments, the power prediction controller 110 is configured to issue an IDENTIFY DEVICE command or IDENTIFY PACKET DEVICE command for all of the ports for the data storage devices 130, 132, . . . 134. In addition, on power on reset (POR) for the system, the power prediction controller 106 can use the IDENTIFY DEVICE command issued over all of the DSD ports 129 to determine if PUIS is supported and enabled by the data storage devices 140. If the PUIS feature set on a port is supported and enabled, upon indication of future access within a host access command (e.g., FIS command), the power prediction controller 110 can initiate spin-up using a PUIS DEVICE SPIN-UP command. Optionally, if PUIS is supported by the respective data storage device coupled to that port but not enabled, the power prediction controller 110 can also issue an ENABLE PUIS FEATURE SET command on start-up to enable PUIS for each port that supports this PUIS mode. Other commands can also be issued and/or supported by additional embodiments while still taking advantage of the power prediction techniques described herein for a port multiplier that is configured to support host connections to multiple data storage devices.

It is further noted that the port multiplier 110, including the power prediction controller 110 and the device message router 128, can be implemented using one or more programmable processing devices. For example, one or more processing devices, such as a processor, microcontroller, configurable logic device (e.g., CPLD (complex programmable logic device), FPGA (field programmable gate array)), and/or other processing device, can be used and programmed to implement the functionality described herein. It is further noted that software or other programming instructions used for the port multiplier 110 and/or its components, can be implemented as software or programming instructions embodied in a non-transitory computer-readable medium (e.g., memory storage devices, FLASH memory, DRAM memory, reprogrammable storage devices, hard drives, floppy disks, DVDs, CD-ROMs, etc.) including instructions that cause processing devices used by the port multiplier 110 to perform the processes, functions, and/or capabilities described herein. It is also noted that the device power state table 116 and the device message buffer 120 can be implemented using one or more data storage devices (e.g., flash memory, random access memory, read only memory, programmable memory devices, reprogrammable storage devices, hard drives, floppy disks, DVDs, CD-ROMs, and/or any other data storage devices).

Figure 2:
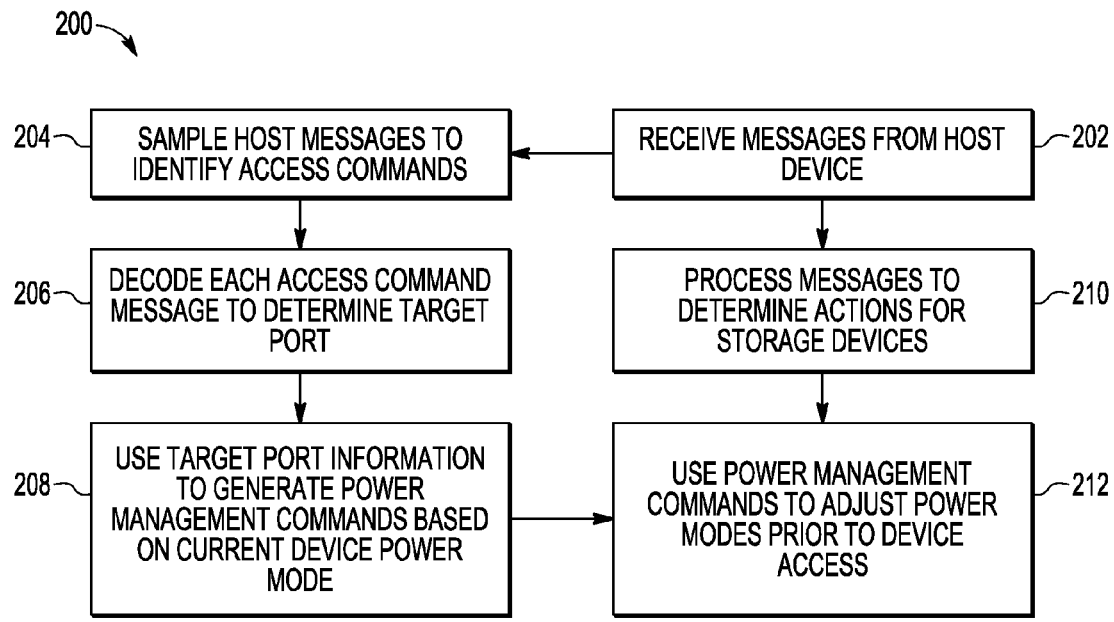
FIG. 2 is a process flow diagram of an example embodiment for predictive power management with respect to a port multiplier.

FIG. 2 is a process flow diagram of an example embodiment 200 for predictive power management with respect to a port multiplier 106. In block 202, host messages 105 are received from a host device 102 for a plurality of data storage devices 130, 132, . . . 134. Next, flow passes to both blocks 204 and 210. In block 210, the host messages 105 are processed to determine actions to be performed for the data storage devices 130, 132, . . . 134 based upon host messages 105. In block 204, the host messages 105 are sampled to identify access commands. In block 206, each access command message is decoded to determine the target port for the target data storage device to be accessed by the access command message. In block 208, the target port information is used to generate one or more power management commands based upon the current device power mode. The current device power mode can be determined, for example, by accessing a power state table 116 where the power prediction controller 110 stores current power state information for each of the data storage devices 130, 132, . . . 134. Block 212 is reached from both blocks 208 and 210, and the power management commands 124 are used to adjust the power modes for target data storage devices to active power modes prior to any access to these devices made by the host messages 105. As such, system latency is reduced as the data storage devices 130, 132, . . . 134 are powered up and placed in an active power mode by the predictive power commands 124 prior to any access.

Figure 3:
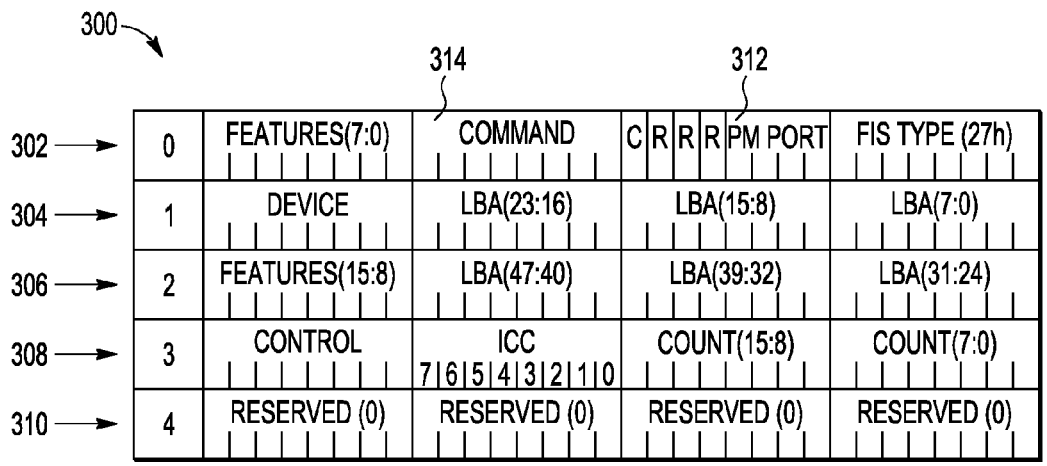
FIG. 3 is a block diagram of an example embodiment for a host command message format where FIS (Frame Information Structure) protocols are used.

FIG. 3 is a block diagram of an example embodiment 300 for a host command message format where FIS protocols are used. As depicted, the FIS message 300 includes a port multiplier (PM) port field 312 that is used to identify the target port within the DSD ports 129 that will be used for the access set forth in the message. For the example embodiment depicted, this PM port field 312 is implemented as a four-bit value that identifies one of fifteen different DSD ports 129 (e.g., Port 0 through Port 14 with value "1111" being reserved). The FIS message 300 also includes a command field 314 that is used to identify the access command or other command being issued by the host device 102. For the example embodiment 300, this command field 314 is implemented as an eight-bit value that identifies different FIS related commands. It is also noted that the target port effectively identifies the target data storage device as a port is associated with each data storage device 130, 132, . . . 134 that is connected to the port multiplier 106.

Looking in more detail to the message format for example FIS embodiment 300, the message includes five (5) 32-bit segments, each having four 8-bit words. Segment 302 (e.g., Segment 0) includes an 8-bit field (e.g., feature bits 7:0) for "Features" that includes feature information for SATA-FIS communications, the command field 314, the PM port field 312 along with a C-bit identifying FIS command/control register write events and three reserved (R) bits, and an FIS type field which will typically include "27" in hex (i.e., 27 h). Segment 304 (e.g., Segment 1) includes a device field that includes host device identification information and three logic block addressing (LBA) fields for bits 23:16, 15:8, and 0:7 of an LBA address associated with the data storage device being accessed. Segment 306 (e.g., Segment 2) includes an "Extended Features" field, where supported, that includes additional bits (e.g., feature bits 15:8) for feature information and three additional logic block addressing (LBA) fields for bits 47:40, 39:32, and 31:24 of the LBA address associated with the data storage device being accessed. Segment 308 (e.g., Segment 3) includes a control field that includes contents to be written to an SATA device control register, an ICC (Isochronous Command Completion) field that includes a time limit value set by the host (if used) for the data storage device, and two count fields that identify the number of contiguous sectors to be accessed within the data storage device (e.g., bits 15:8 and bits 7:0 representing this number of sectors). For example embodiment 300, segment 310 (e.g., Segment 4) includes four reserved fields that are not defined but are reserved for future use. It is noted that for the next port (NP) field embodiments described below with respect to FIGS. 5-6, two of these reserved fields in segment 310 provide a next port (NP) field that is used by the host device 102 to identify a next port to be accessed among the DSD ports 129.

Figure 4A:
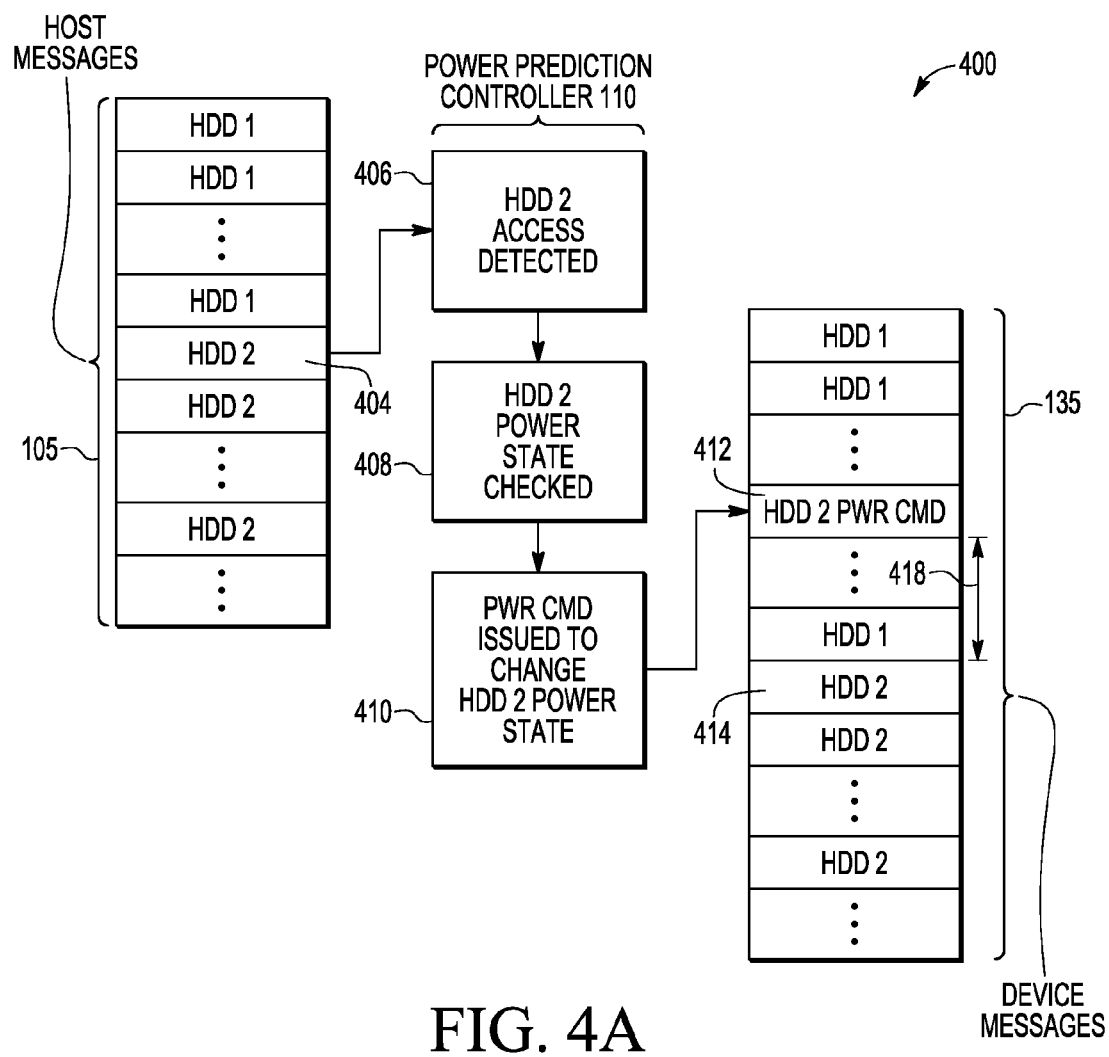
FIG. 4A is a block diagram an example embodiment where device messages include a power command that has been generated based upon a target port predicted from host messages.

FIG. 4A is a block diagram an example embodiment 400 where device messages 135 include a power command 412 that has been generated based upon a target port predicted from host messages 105. For the example embodiment 400, it is assumed that host messages 105 are received from host device 102 and include port information for accesses to a first hard disc drive (HDD1) and then to a second hard disc drive (HDD2). As indicated by host message 404, the accesses switch from HDD1 to HDD2 during the series of host messages 105 received from the host device 102. As represented by block 406, the power prediction 110 detects the upcoming access to HDD2 after sampling and decoding the host message 404. As represented by block 408, the power prediction controller 110 checks the power state for HDD2, for example, by accessing the current power state for HDD2 within the device power state table 116. It is assumed for embodiment 400 that HDD2 is currently in a power-down mode. As represented by block 410, the power prediction controller 110 then generates a power command 412 to change the power state for HDD2 to an active power mode so that it will be ready for the access requested by host message 404.

Looking to the device messages 135, accesses to HDD1 are followed by accesses to HDD2 as requested within the host messages 105. Device message 414, which first accesses HDD2 after a series of accesses to HDD1, corresponds to the host message 404. As described above, these device messages 135 can be stored in the device message buffer 120 before being routed to target data storage devices by the device message router 128. The power command 412 generated and issued by the power prediction controller 110, as represented in block 410, is inserted into the message queue for the device messages 135 as indicated by the HDD2 power command (PWR CMD) message 412 within the device messages 135. As indicated by the message separation gap 418, the HDD2 power command message 412 is included far enough in advance of the first HDD2 access in device message 414 so that HDD2 has time to change its power state to an active mode before this access. The separation gap 418, for example, can represent a time that is greater than this power change time for HDD2 to adjust its power mode ahead of the predicted access. Further, although a single power command 412 is shown in embodiment 400, multiple power commands could also be generated and issued by the power prediction controller 110 if additional commands were required within device messages 135 to achieve a desired active power mode for HDD2 with respect to the predicted access by device message 414. Other variations could also be implemented while still including one or more power mode adjustment commands, as needed, that are generated and issued by the power prediction controller 110 to place the target data storage device in an appropriate power state for the access thereby reducing latency for the host device 102.

Figure 4B:
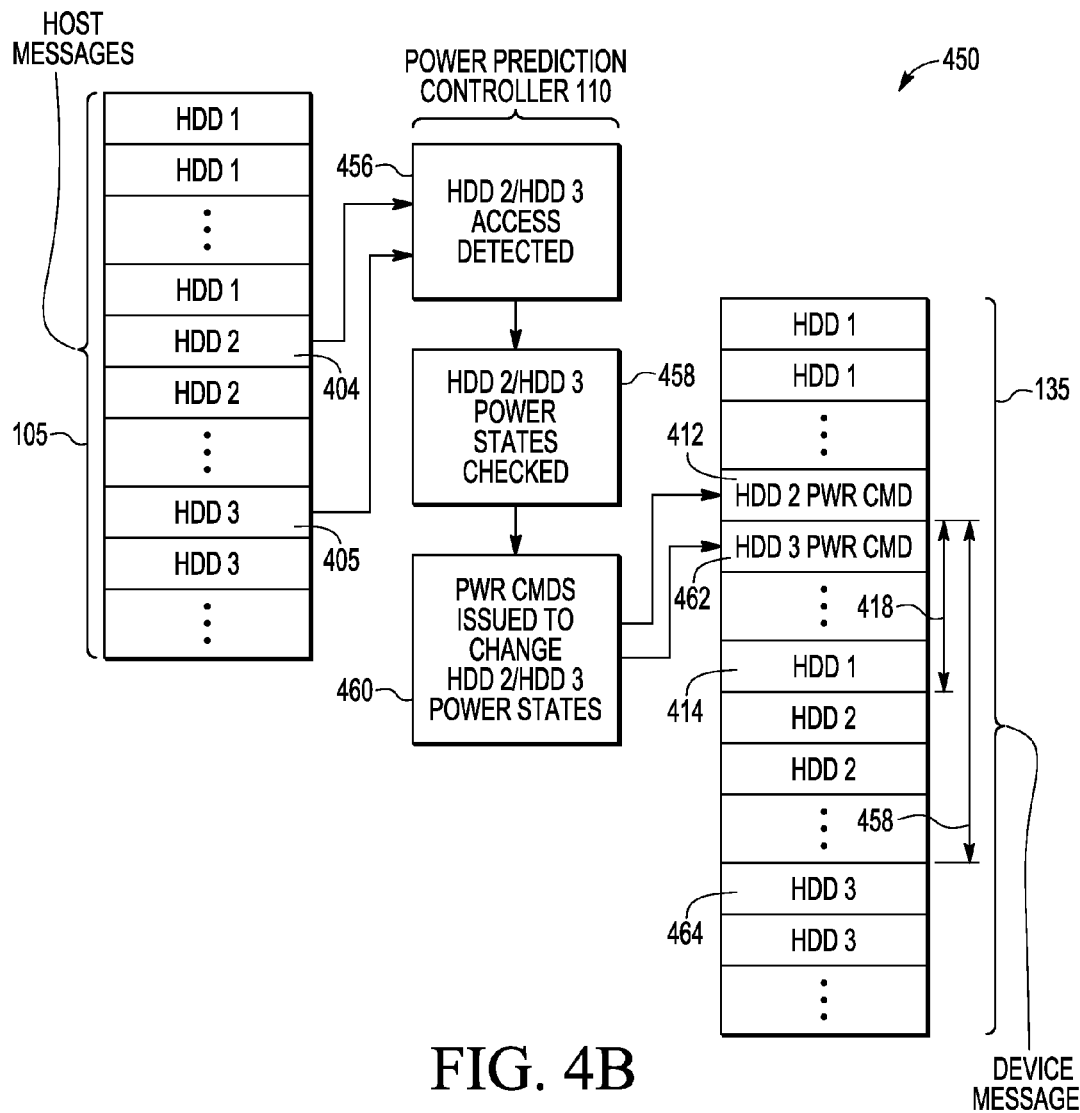
FIG. 4B is a block diagram an example embodiment where device messages include power commands that have been generated based upon multiple target ports predicted from host messages.

FIG. 4B is a block diagram an example embodiment 450 where device messages 135 include power commands 412 and 462 that have been generated based upon multiple target ports predicted from host messages 105. For the example embodiment 450, it is assumed that host messages 105 also include port information for accesses to a third hard disc drive (HDD3) in addition to accesses to HDD1 and HDD2 as shown in embodiment 400 of FIG. 4A. As indicated by host message 405, the accesses switch from HDD1 to HDD2 and then from HDD2 to HDD3 during the series of host messages 105 received from the host device 102. As represented by block 456, the power prediction 110 detects the upcoming accesses to both HDD2 and HDD3 after sampling and decoding the host messages 404 and 405. As represented by block 458, the power prediction controller 110 checks the power states for both HDD2 and HDD3, for example, by accessing the current power states for HDD2 and HDD3 within the device power state table 116. It is assumed for embodiment 450 that HDD2 and HDD3 are currently in power-down modes. As represented by block 460, the power prediction controller 110 then generates power commands 412 and 462 to change the power states for HDD2 and HDD3 to active power modes so that they will be ready for the accesses requested by host messages 404 and 405.

Looking to the device messages 135, accesses to HDD1 are followed by accesses to HDD2 and then to HDD3 as requested within the host messages 105. Device message 414, which first accesses HDD2, corresponds to the host message 404. Device message 464, which first accesses HDD3, corresponds to the host message 405. As described above, these device messages 135 can be stored in the device message buffer 120 before being routed to target data storage devices by the device message router 128. The power commands 412 and 462, which are generated and issued by the power prediction controller 110 as represented in block 460, are inserted into the message queue for the device messages 135 as indicated by the HDD2 power command (PWR CMD) message 412 and by the HDD2 power command (PWR CMD) message 462 within the device messages 135. As indicated by the message separation gaps 418 and 458, the HDD2/HDD3 power command messages 412/462 are included far enough in advance of the first HDD2 access and first HDD3 access through device messages 414/464 so that HDD2 and HDD3 have time to change their power states to active modes before these respective accesses. The separation gaps 418 and 458, for example, can represent times that are greater than the respective power change times for HDD2 and HDD3 to adjust their power modes ahead of the predicted accesses. Further, it is again noted that although single power commands 412/462 are shown in embodiment 450, multiple power commands could also be generated and issued by the power prediction controller 110 for HDD2 and/or HDD3 if additional commands were required within device messages 135 to achieve desired active power modes. Other variations could also be implemented while still including power mode adjustment commands, as needed, that are generated and issued by the power prediction controller 110 to place target data storage devices in appropriate power states for subsequent accesses thereby reducing latency for the host device 102.

As indicated above, predictive power mode adjustments can also be implemented by using a field within the host access command messages to identify one or more next ports to be accessed after a current port being accessed. For such an implementation, when the host message is generated, next port information is placed in a next port (NP) field within the host message to identify one or more next ports to be accessed. This next port information added to the next port (NP) field is in addition to port information for the current port to be accessed. It is again noted that the target port for an access effectively identifies the target data storage device as a port is associated with each data storage device 130, 132, . . . 134 that is connected to the port multiplier 106.

Figure 5:
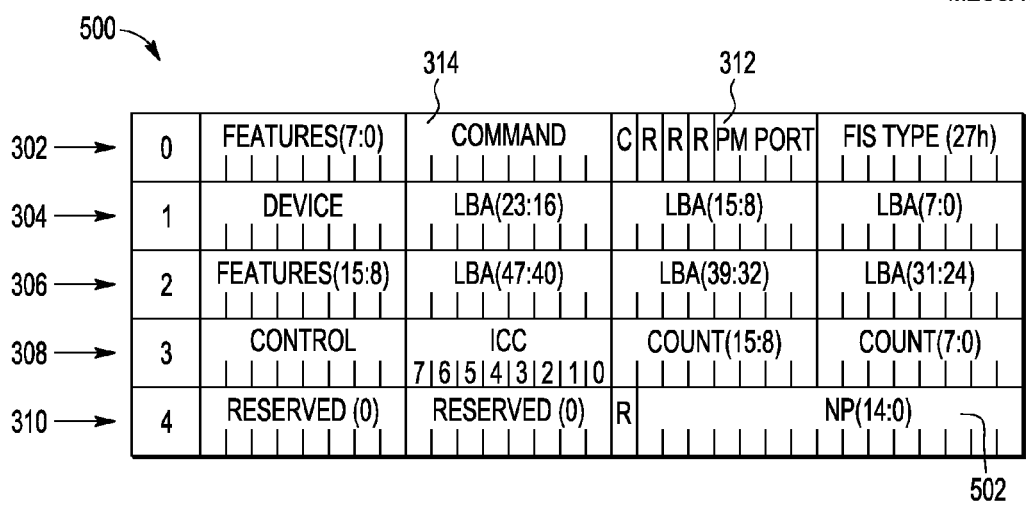
FIG. 5 provides an example embodiment for a host command message format where FIS (Frame Information Structure) protocols are used with the addition of a next port (NP) field.

FIG. 5 provides an example embodiment 500 for a host command message format where FIS protocols are used with the addition of a next port (NP) field 502. For the embodiment 500, two of the eight-bit reserved fields within the segment 310 (e.g., Segment 4) are used to form a next port (NP) field 502 including a 15-bit pre-decoded value identifying one or more next ports to be accessed (e.g., bits 14:0). A sixteenth bit can be reserved (R) for future use. For this embodiment 500, each bit in the NP field 502 corresponds to one of the DSD ports 129 in the port multiplier 106. One or more target next ports to be accessed are indicated by modifying the logic level for that respective bit positions within the NP field 502. The following table provides example pre-decoded values where a logic "1" in a bit position is used to identify a single target next port, and the other bit positions are set to a logic "0." Multiple next ports can also be indicted within the NP field 502 by setting more than one bit position to a logic "1" within the NP field 502. For example if Port 2, Port 7, and Port 12 were to be indicated as multiple next ports to be accessed, the value in the NP field 502 would be "001000010000100" such that the bit positions for these ports would be a logic "1" and the others bit positions would be a logic "0." It is noted that other coding schemes could also be used for the NP field 502, as desired, to identify target ports predicted for subsequent accesses.

TABLE 3

EXAMPLE PRE-DECODED VALUES
FOR NEXT PORT (NP) FIELD

| 15-Bit Value | Next Port Indication |
| --- | --- |
| 000000000000001 | Port 0 |
| 000000000000010 | Port 1 |
| 000000000000100 | Port 2 |
| 000000000001000 | Port 3 |
| 000000000010000 | Port 4 |
| 000000000100000 | Port 5 |
| * * * | * * * |
| 001000000000000 | Port 14 |
| 010000000000000 | Port 15 |
| 100000000000000 | reserved |

Figure 6:
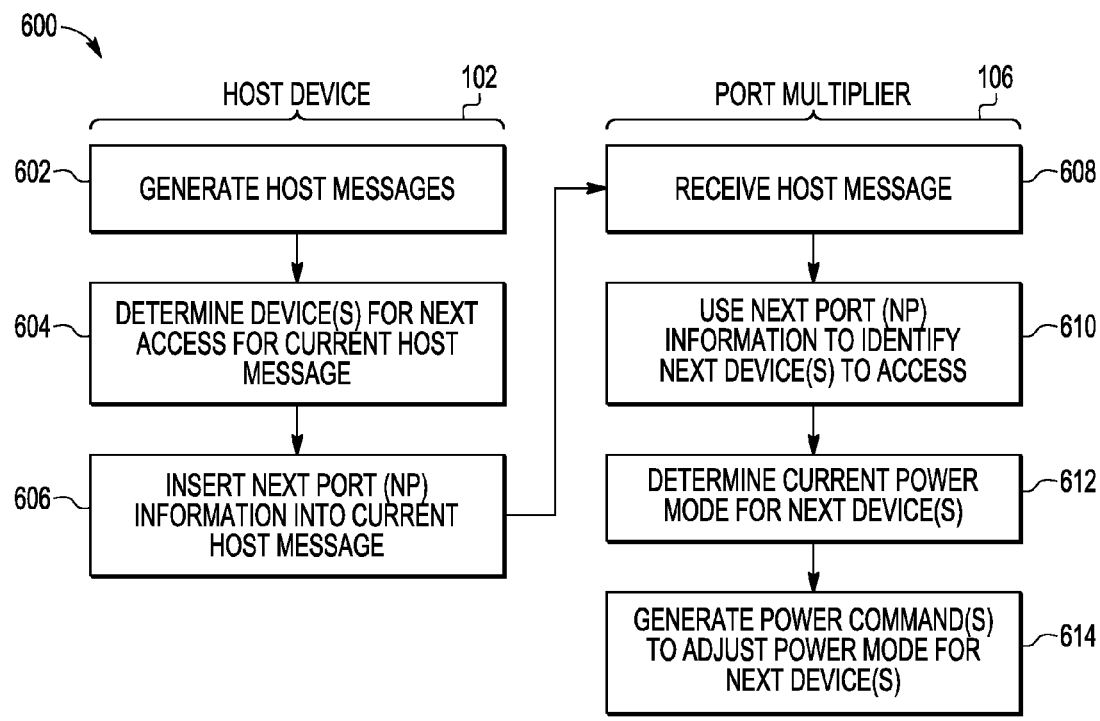
FIG. 6 is a process flow diagram of an example embodiment for using a next port (NP) field within a host message to provide power prediction for a port multiplier.

FIG. 6 is a process flow diagram of an example embodiment 600 for using a next port (NP) field 502 within a host message to provide power prediction for a port multiplier 106. Blocks 602, 604, and 606 are performed by the host device 102. Blocks 608, 610, 612, and 614 are performed by the port multiplier 106. In block 602, the host device 102 generates a plurality of host messages 105. In block 604, the host device 102 determines one or more next data storage devices to be accessed for each current host message, for example, by examining the PM port field 312 in host messages that come after the current host message. In block 606, the host device 102 inserts next port (NP) identification information into the current host message such as within a next port (NP) field 502. For example, where fifteen ports are supported by the port multiplier 106 and a 15-bit pre-decoded value is used for the next port (NP) field 502, the next port (NP) identification information can be implemented by setting one or more bits within the field to indicate the one or more next ports to be accessed, as indicated above. In block 608, the port multiplier 106 receives the host message with the next port (NP) identification information within the next port (NP) field 502. In block 610, the port multiplier 106 uses the next port (NP) information within the next port (NP) field 502 to identify the one or more next devices that will be accessed. In block 612, the port multiplier 106 determines the current power mode for the one or more next devices to be accessed, for example, by accessing the current power state for each of these next devices within the device power state table 116. In block 614, the port multiplier 106 generates one or more power commands to adjust the power mode for the one or more next devices, as needed, so that each next device will be prepared for the access.

It is noted that the power prediction controller 110 for the port multiplier 106 can be configured for some embodiments to use a simplified sequence of commands to adjust the power mode of any particular next device to be accessed. For example, once the next port (NP) field 502 is used to determine a next device to be accessed, the power prediction controller 110 can issue the following sequence of commands if the current status for the device is a power down mode but not sleep mode: (1) issue a read media command (e.g., READ DMA), and (2) then issue a no operation command (e.g., NO OP) to abort the dummy read access initiated for the read media command. If the current status for the device is a sleep mode, then the power prediction controller 110 can issue the following sequence of commands: (1) communication reset command (e.g., COMRESET), (2) then issue a read media command (e.g., READ DMA), and (3) then issue a no operation command (e.g., NO OP) to abort the dummy read access initiated for the read media command. Other sequences of simplified commands could also be used, if desired.

It is further noted that the power prediction controller 110 can be configured to automatically power down data storage devices 130, 132, . . . 134 using idle time counters to determine when data storage devices should be powered down. For example, a counter for each data storage device can be used to determine when a predetermined number of host messages 105 or message cycles have occurred without an access to a particular data storage device, and this particular data storage device can then be powered down. The idle time counters can thereby be used to identify idle data storage devices to power down after a predetermined time period has passed. This additional automated power down further reduces power consumption for the disclosed embodiments.

Figure 7:
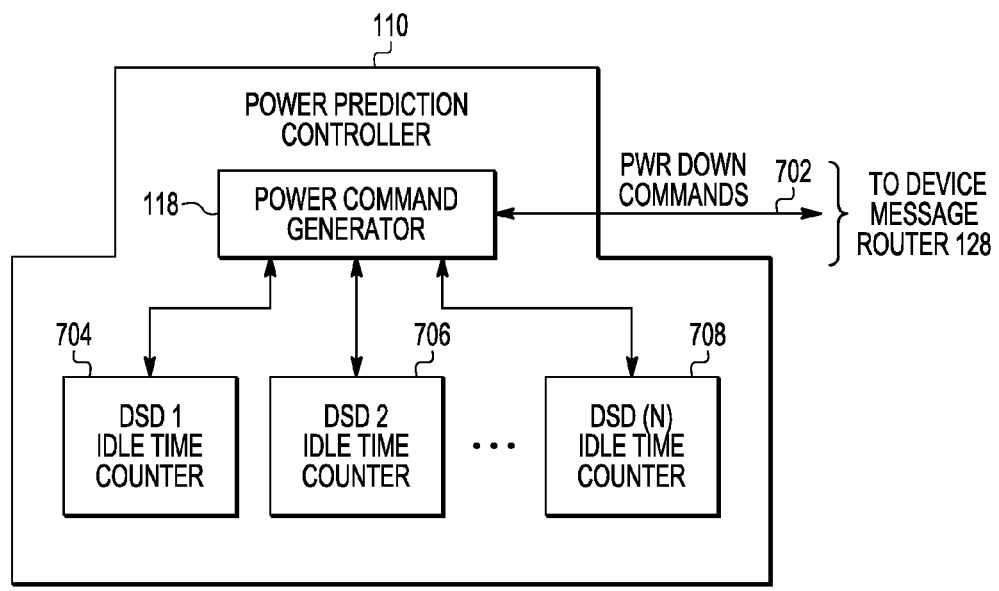
FIG. 7 is a block diagram of an example embodiment for a power prediction controller that includes counters to keep track of idle times for the plurality of data storage devices and that uses the counters to initiate power down of data storage devices after predetermined idle time periods.

FIG. 7 is block diagram of an example embodiment for a power prediction controller 110 that includes counters 704, 706, . . . 708 to keep track of idle times for the plurality of data storage devices 130, 132, . . . 134 and that uses the counters to initiate power down of data storage devices after predetermined idle time periods have passed. For example, the power prediction controller uses counter 704 to track idle time for a the first DSD 130, uses counter 706 to track idle time for a second DSD 132, and so on with counter 708 being used to track idle time for an Nth DSD 134. For one embodiment, these counters 704, 706, . . . 708 are incremented each time a host message is received from the host device 102 and processed within a message cycle by the port multiplier 106. The power command generator 118 monitors the counter values, and a counter value for a particular data storage device is reset if the particular data storage device is accessed. If one of the counters 704, 706, . . . 708 exceeds a selected threshold value indicating that a predetermined idle time period has passed, the power command generator 118 issues one or more power down commands 702 to the device message router 128 to power down the data storage device associated with that respective counter. The power prediction controller 110 also then updates respective power state information within the power state table 116.

For example, if counter 706 associated with the second data storage device 132 exceeds a selected threshold value (e.g., counter value exceeds 20-50 host messages or message cycles without access) thereby indicating that a predetermined idle time period has passed, the power command generator 118 issues one or more power down commands 702 to the port within DSD ports 129 associated with the second data storage device (DSD) 132. The power state information within the power state table 116 associated with second DSD will also be updated. It is also noted that the counters 704, 706, . . . 708 can be set to a predetermined initial value, and each counter can then be decremented each cycle that a host message does not access the respective data storage device associated with the counter. Once the counter reaches zero and/or otherwise expires after a predetermined idle time period, the power command generator 118 can generate and issue the power down commands 702 to the device message router 128 for distribution to the appropriate target data storage device. Other variations could also be implemented while still using counters to indicate idle data storage devices for automatic power down by the power prediction controller 110 within the port multiplier 106.

As described herein, a variety of embodiments can be implemented and different features and variations can be implemented, as desired.

For one embodiment, a method to manage power modes for multiple data storage devices is disclosed including receiving host messages from a host device for a plurality of data storage devices where the host messages include access commands for the plurality of data storage devices, determining target storage devices for the access commands, adjusting power modes for the target data storage devices to place the target data storage devices in active power modes prior to forwarding the access commands to the target data storage devices, and forwarding the access commands to the target data storage devices for the access commands.

In additional embodiments, the determining includes sampling the host messages to identify access commands within the host messages and decoding the access commands to determine the target data storage devices. In further embodiments, for each target data storage device, the adjusting includes generating one or more power commands to place the target data storage device in an active power mode. In still further embodiments, the method also includes storing power mode states for the plurality of data storage devices within a device power state table, using the device power state table to determine a current power mode for a target data storage device, and generating the one or more power commands based upon the current power mode. In other embodiments, the adjusting is not performed where a current power mode is already an active power mode.

In additional embodiments, the method also includes storing the access commands within a device message buffer, inserting the one or more power commands for each target data storage device into the device message buffer before the access command for that target data storage device, and forwarding device messages from the device message buffer to target data storage devices.

In additional embodiments, the determining includes obtaining target port information from a field within each access command and using the target port information to determine a target data storage device for each access command. In further embodiments, the determining includes obtaining next port information from a field within each access command and using the next port information to determine one or more target data storage devices for each access command. In still further embodiments, this next port field includes a plurality of bit positions where each bit position is associated with a data storage device, and logic levels for the plurality of bit positions determine the one or more target data storage devices.

In additional embodiments, the method also includes monitoring idle times for a plurality of data storage devices using a plurality of counters, each counter being associated with a data storage device and generating one or more power commands to power down a data storage device after a predetermined idle time period has passed based upon a counter value for the counter associated with that data storage device.

For one embodiment, a port multiplier to manage power modes for multiple data storage devices is disclosed that includes a host interface configured to receive host messages from a host device for a plurality of data storage devices where the host messages include access commands for the plurality of data storage devices, a plurality of ports configured to be coupled to a plurality of data storage devices, a controller configured to determine target storage devices for the access commands and to generate power commands to adjust power modes for the target data storage devices to place the target data storage devices in active power modes for accesses associated with the access commands, and a router configured to forward the power commands and the access commands to the target data storage devices through the plurality of ports.

In additional embodiments, the controller further includes a sampler configured to sample the host messages to identify the access commands and a decoder configured to decode the access commands to determine the target data storage devices. In further embodiments, the port multiplier also includes a device power mode table configured to store power mode states for the plurality of data storage devices. In still further embodiments, the controller is configured to use the device power state table to determine a current power mode for a target data storage device and to generate the one or more power commands based upon the current power mode. In other embodiments, the controller is configured not to generate power commands where a current power mode is an active power mode.

In additional embodiments, the port multiplier also includes a device message buffer configured to store the access commands; the controller is configured to insert the one or more power commands for each target data storage device into the device message buffer before an access command for that target data storage device; and the router is further configured to forward access commands and power commands from the device message buffer to target data storage devices.

In additional embodiments, the controller is configured to obtain target port information from a field within each access command and to use the target port information to determine a target data storage device for each access command. In further embodiments, the controller is configured to obtain next port information from a field within each access command and to use the next port information to determine one or more target data storage devices for each access command. In still further embodiments, this next port field includes a plurality of bit positions where each bit position is associated with a data storage device, and logic levels for the plurality of bit positions determine the one or more target data storage devices.

In additional embodiments, the port multiplier includes a plurality of counters where each counter is configured to track idle time for a data storage device, and the controller is further configured to generate one or more power commands to power down a data storage device after a predetermined idle time period has passed based upon a counter value for the counter associated with that data storage device.

It is further noted that the functional blocks, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method to manage power modes for multiple data storage devices, comprising:
  receiving host messages from a host device for a plurality of data storage devices, the host messages comprising access commands for the plurality of data storage devices;
  determining target data storage devices within the plurality of data storage devices for the access commands, wherein the determining for each of the access commands comprises:
    obtaining target port information from a first field within the access command representing a current port being accessed and using the target port information to identify a first target data storage device for the target data storage devices; and
    obtaining next port information from a second field within the access command representing one or more ports to be accessed after the current port and using the next port information to identify one or more additional target data storage devices for the target data storage devices;
  adjusting power modes for the target data storage devices to place the target data storage devices in active power modes prior to forwarding the access commands to the target data storage devices, the target storage devices for each access command including the first target data storage device and the one or more additional target storage devices; and
  forwarding the access commands to the target data storage devices.

2. The method of claim 1, wherein the determining comprises:
  sampling the host messages to identify the access commands within the host messages; and
  decoding the access commands to determine the target data storage devices.

3. The method of claim 1, wherein, for each target data storage device, the adjusting comprises generating one or more power commands to place the target data storage device in its active power mode.

4. The method of claim 3, further comprising:
  storing power mode states for the plurality of data storage devices within a device power state table; and
  for each target data storage device,
    using the device power state table to determine a current power mode for that target data storage device; and
    generating the one or more power commands based upon the current power mode.

5. The method of claim 4, wherein, for each target data storage device, the adjusting is not performed where the current power mode is already its active power mode.

6. The method of claim 3, further comprising:
  storing the access commands within a device message buffer;
  inserting the one or more power commands for each target data storage device into the device message buffer before the access command for that target data storage device; and
  forwarding device messages from the device message buffer to the target data storage devices.

7. The method of claim 1, wherein the second field comprises a plurality of bit positions for a pre-decoded value, wherein each bit position is associated with one of the data storage devices, and wherein logic levels for the plurality of bit positions determine the one or more additional target data storage devices.

8. The method of claim 1, further comprising:
monitoring idle times for the plurality of data storage devices using a plurality of counters, each counter being associated with one of the data storage devices; and
for each of the plurality of data storage devices, generating one or more power commands to power down that data storage device after a predetermined idle time period has passed based upon a counter value for the counter associated with that data storage device.

9. A port multiplier to manage power modes for multiple data storage devices, comprising:
a host interface configured to receive host messages from a host device for a plurality of data storage devices, the host messages comprising access commands for the plurality of data storage devices;
a plurality of ports configured to be coupled to a plurality of data storage devices;
a controller configured to determine target data storage devices within the plurality of data storage devices for the access commands and to generate power commands to adjust power modes for the target data storage devices to place the target data storage devices in active power modes for accesses associated with the access commands, the target storage devices for each access command including a first target data storage device and one or more additional target storage devices; and
a router configured to forward the power commands and the access commands to the target data storage devices through the plurality of ports;
wherein the controller is configured, for each of the access commands, to obtain target port information from a first field within the access command representing a current port being accessed and to use the target port information to identify the first target data storage device for the target data storage devices; and
wherein the controller is configured, for each of the access commands, to obtain next port information from a second field within the access command representing one or more ports to be accessed after the current port and to use the next port information to identify the one or more additional target data storage devices for the target data storage devices.

10. The port multiplier of claim 9, wherein the controller further comprises:
a sampler configured to sample the host messages to identify the access commands; and
a decoder configured to decode the access commands to determine the target data storage devices.

11. The port multiplier of claim 9, further comprising a device power mode table configured to store power mode states for the plurality of data storage devices.

12. The port multiplier of claim 11, wherein the controller is configured, for each target data storage device, to use the device power state table to determine a current power mode for that target data storage device and to generate one or more power commands based upon the current power mode.

13. The port multiplier of claim 12, wherein the controller is configured not to generate power commands where the current power mode is an active power mode.

14. The port multiplier of claim 12, further comprising a device message buffer configured to store the access commands, and wherein the controller is configured to insert the one or more power commands for each target data storage device into the device message buffer before an access command for that target data storage device, and wherein the router is further configured to forward access commands and power commands from the device message buffer to the target data storage devices.

15. The port multiplier of claim 9, wherein the second field comprises a plurality of bit positions for a pre-decoded value, wherein each bit position is associated with one of the data storage devices, and wherein logic levels for the plurality of bit positions determine the one or more additional target data storage devices.

16. The port multiplier of claim 9, further comprising a plurality of counters, each counter being configured to track idle time for one of the data storage devices, and wherein the controller is further configured, for each of the plurality of data storage devices, to generate one or more power commands to power down that data storage device after a predetermined idle time period has passed based upon a counter value for the counter associated with that data storage device.

* * * * *